J. J. KELLEHER & C. D. PORTER.
CAR ROOF CONSTRUCTION.
APPLICATION FILED MAR. 2, 1912.
1,047,949.
Patented Dec. 24, 1912.
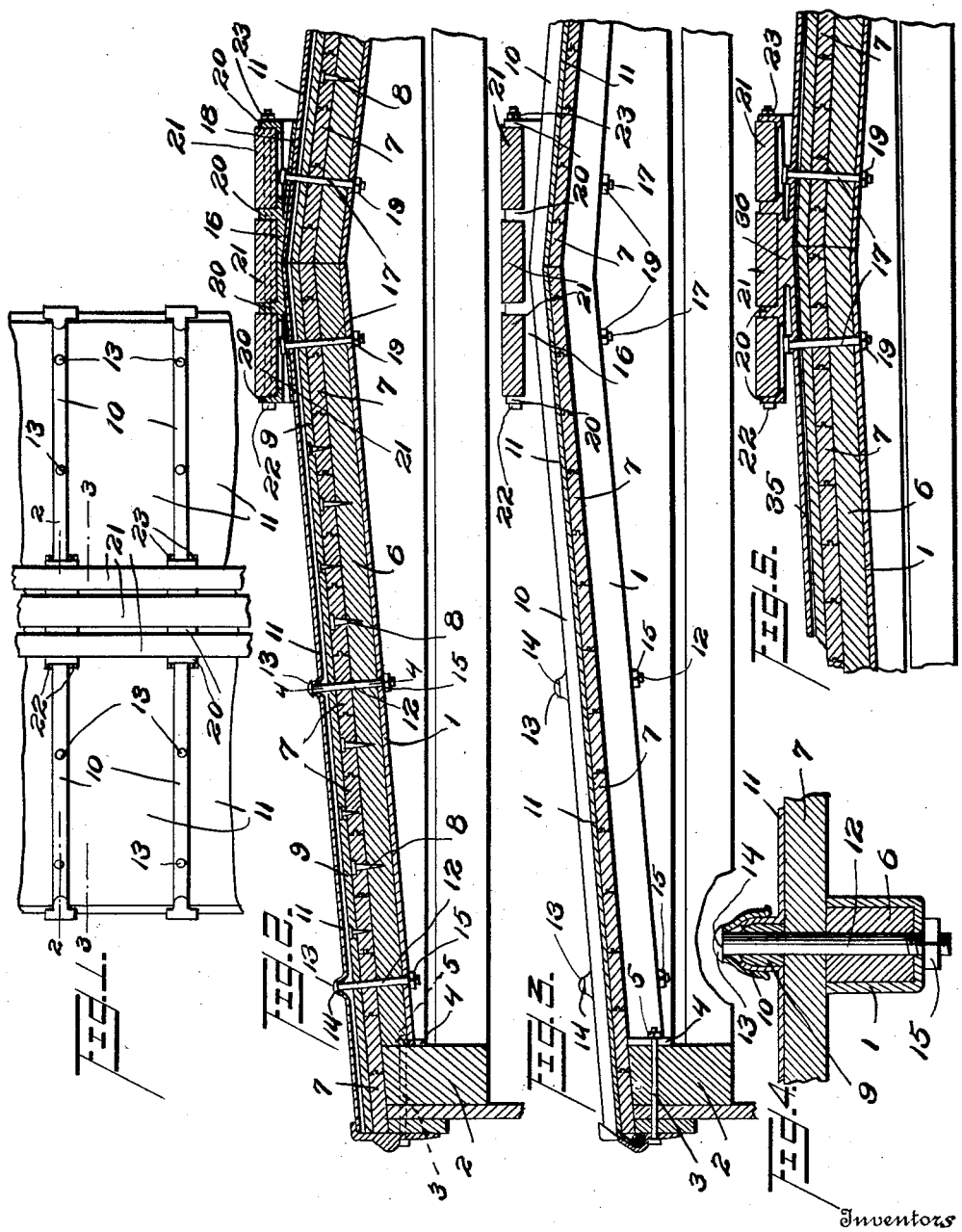
Inventors
Jeremiah J. Kelleher
and Charles D. Porter
Witnesses
H. Strauss
R. H. Krenkel.
By Joshua R. H. Potts.
Attorney

UNITED STATES PATENT OFFICE.

JEREMIAH J. KELLEHER, OF PHILADELPHIA, AND CHARLES D. PORTER, OF WILKINSBURG, PENNSYLVANIA.

CAR-ROOF CONSTRUCTION.

1,047,949.  Specification of Letters Patent.  Patented Dec. 24, 1912.

Original application filed November 8, 1911, Serial No. 659,090. Divided and this application filed March 2, 1912. Serial No. 681,028.

*To all whom it may concern:*

Be it known that we, JEREMIAH J. KELLEHER and CHARLES D. PORTER, citizens of the United States, residing at Philadelphia, county of Philadelphia, and State of Pennsylvania, and Wilkinsburg, county of Allegheny, and State of Pennsylvania, respectively, have invented certain new and useful Improvements in Car-Roof Construction, of which the following is a specification.

Our invention relates to improvements in car roof constructions, the object of the invention being to provide an improved car roof which will embody the maximum of strength and durability.

A further object is to provide an improved construction of carline and cap secured together by bolts and confining the roof timbers and filler pieces between them, and provide on said cap pieces, improved running board saddles with running boards thereon.

This application is a division of our application filed November 8, 1911 and given Serial No. 659,090.

With these and other objects in view, the invention consists in certain novel features of construction and combinations and arrangements of parts, as will be more fully hereinafter described and pointed out in the claims.

In the accompanying drawings: Figure 1, is a fragmentary top plan view illustrating our improvements. Fig. 2, is a view in section on an enlarged scale on the line 2—2 of Fig. 1. Fig. 3, is a similar view in section on the line 3—3 of Fig. 1. Fig. 4, is a view in transverse section on an enlarged scale on the line 4—4 of Fig. 2, and Fig. 5, is a view on an enlarged scale of the central portion of the car roof structure similar to Fig. 2, but showing a modification.

A longitudinal series of transversely positioned channel bars or carlines 1 are secured at their ends to longitudinal side beams 2 by means of bolts 3. The ends of the carlines have laterally projecting perforated plates 4 integral with the carlines, and through which the bolts 3 project, and are secured by nuts 5.

The carlines are arched to conform to the shape of the roof, and contain filler pieces 6 of wood. To these filler pieces, the roof timbers 7 are secured by nails 8, and covering the heads of these nails are transversely positioned filler pieces 9 which are curved transversely on their outer faces, and on their inner faces are flat, and lie against and across the roof timbers 7. Metal caps 10 are positioned on the cap filler pieces 9, and at their lower ends are curved outwardly so as not to present any sharp edges which might cut when any motion is given the timbers. These caps 10 are approximately inverted U-shape in cross section, and extend throughout the width of the car directly above the carline 1, and they also confine the longitudinal edges of roof plates 11. These roof plates are of sheet metal, and their longitudinal edges extend over the filler pieces 9 under the caps 10, and said caps 10, filler pieces 9, filler pieces 6, and carlines 1, together with the roof timbers 7, are made with registering openings for the reception of bolts 12. The heads 13 of these bolts bear tightly against flattened surfaces 14 on the caps 10, which flattened surfaces are formed by forcing the metal outwardly to form the openings, and the said bolts are securely clamped by nuts 15 on their inner ends.

By tightening the nuts 15, the roof timbers 7, as well as the roof plate 11 are securely clamped, and the structure is therefore strong and durable. As the filler pieces 9 cover the nails 8, the latter cannot work loose, and are securely held in driven position.

On the crown of the roof, on each cap 10, a metal saddle 16 is located. Each saddle comprises a casting having its lower face inclined downwardly in both directions transversely from its center, and curved in the arc of a circle longitudinally of the car to snugly fit the cap 10 as seen most clearly in Figs. 2, 3, and 5. These saddles are secured to the roof structure by bolts 17, which are projected through the lower inclined members 18 of the saddle, and are secured by nuts 19. The upper portion of the saddle is horizontal, and is provided with four upwardly projecting lugs 20 between which the parallel running boards 21 are located. These running boards are secured against movement by long bolts 22, which extend through registering openings in the lugs 20, and in the running boards 21, and are secured by nuts 23. It will therefore be seen that the upper surface of the running board is free from bolt heads, and the like, as the boards are secured entirely by means of the transversely positioned bolts 22. This is a decided advantage because this upper surface must be kept smooth.

In Fig. 5, we illustrate a modification in which the cap 35 and saddle 36 are made integral which may, in some instances, be a desirable structure.

Various other slight changes might be made in the general form and arrangement of parts described without departing from our invention, and hence we do not limit ourselves to the precise details set forth, but consider ourselves at liberty to make such changes and alterations as fairly fall within the spirit and scope of the appended claims.

Having thus described our invention, what we claim as new and desire to secure by Letters Patent is:

1. The combination with a car roof, saddles secured on the car roof, parallel flanges on the saddles, running boards located on the saddles between said flanges, said flanges and said running boards having registering openings, bolts through said openings, and nuts on said bolts securing the running boards to the saddles, substantially as described.

2. In combination, a car roof, a plurality of saddles secured thereon, said saddles having parallel flanges on their upper faces, running boards located between the flanges, said running boards and said flanges having alined openings, bolts in said openings, and nuts on said bolts, substantially as described.

In testimony whereof we have signed our names to this specification in the presence of two subscribing witnesses.

JEREMIAH J. KELLEHER.
CHARLES D. PORTER.

Witnesses:
R. H. KRENKEL,
CHARLES E. POTTS.

Copies of this patent may be obtained for five cents each, by addressing the "Commissioner of Patents, Washington, D. C."